(12) United States Patent
Schmieder et al.

(10) Patent No.: US 8,463,918 B2
(45) Date of Patent: *Jun. 11, 2013

(54) LOSS TOLERANT PROTOCOL FOR REMOTING DESKTOP GRAPHICS

(75) Inventors: Wilhelm R. Schmieder, Snoqualmie, WA (US); Tong L. Wynn, Redmond, WA (US); Nadim Y. Abdo, Bellevue, WA (US); Graham Edward Fagg, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/691,979

(22) Filed: Jan. 22, 2010

(65) Prior Publication Data
US 2011/0185071 A1     Jul. 28, 2011

(51) Int. Cl.
*G06F 15/16* (2006.01)

(52) U.S. Cl.
USPC .......................................... 709/228; 709/227

(58) Field of Classification Search
None
See application file for complete search history.

(56) References Cited

U.S. PATENT DOCUMENTS

| 6,061,714 | A | 5/2000 | Housel, III et al. |
| 6,989,836 | B2 | 1/2006 | Ramsey |
| 7,051,358 | B2 | 5/2006 | Hakenberg et al. |
| 7,185,069 | B2 | 2/2007 | Costin et al. |
| 7,274,368 | B1 | 9/2007 | Keslin |
| 7,346,652 | B2 | 3/2008 | Berrigan et al. |
| 7,441,267 | B1 | 10/2008 | Elliott |
| 7,587,520 | B1 | 9/2009 | Kent et al. |
| 7,720,906 | B2* | 5/2010 | Brockway et al. ............. 709/203 |
| 2006/0179118 | A1* | 8/2006 | Stirbu ............................ 709/217 |
| 2008/0301566 | A1 | 12/2008 | Abdo et al. |
| 2008/0313545 | A1 | 12/2008 | Patel et al. |
| 2009/0183085 | A1* | 7/2009 | Pasetto et al. .................. 715/744 |
| 2010/0268828 | A1* | 10/2010 | Pahlavan et al. .............. 709/227 |

OTHER PUBLICATIONS

Sinha, R. et al., "An Adaptive Multiple Retransmission Technique for Continuous Media Streams," Dec. 18, 2008, 6 pages, downloaded at www.cs.colostate.edu/~christos/papers/nossdav04.pdf.

* cited by examiner

*Primary Examiner* — Mohamed Ibrahim
(74) *Attorney, Agent, or Firm* — Woodcock Washburn, LLC

(57) ABSTRACT

In various embodiments, remote presentation encoding techniques may be modified in such a way that the data can be transmitted over transports without guaranteed packet delivery. In one embodiment, the desktop graphics data may be encoded in individual frames, each frame comprising self-contained graphics elements that fit in a small number of User Datagram Protocol (UDP) protocol data units (PDUs). The PDUs may then be sent to the client on a separate lossy link instead of the lossless link. On the client side, the client may detect which graphic elements within a frame were "lost" as a result of dropped UDP packets and request a refresh from the server through the lossless channel.

20 Claims, 12 Drawing Sheets

LOSS TOLERANT PROTOCOL FOR REMOTING DESKTOP GRAPHICS

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

In remote desktop scenarios the graphics content of a user's desktop located on a host computer (e.g., the server) is typically streamed to another computer (e.g., the client). The server and the client will exchange the desktop graphics data in a well defined protocol or format. Some remote desktop presentation protocols are stream oriented protocols that may use a stream based transport such as the Transmission Control Protocol (TCP) for exchanging data with the client. Protocols such as the TCP protocol typically exhibit high latency especially when the underlying transport is a wide area network (WAN) connection. If such a link is used for remote presentation data traffic, such latencies may result in a negative user experience because the desktop graphics data may be delivered to the client in a time delayed fashion. Thus, other techniques are needed in the art to solve the above described problems.

SUMMARY

In various embodiments, methods and systems are disclosed that address the above issues by providing a loss tolerant graphics exchange protocol and thus allowing the use of a non-stream based protocol such as User Datagram Protocol (UDP).

In some embodiments, some of the RDP specific encoding techniques may be modified in such a way that the data can be transmitted over transports without guaranteed packet delivery. In one embodiment, the desktop graphics data may be encoded in individual frames, each frame comprising self-contained graphics elements that fit in a small number of User Datagram Protocol (UDP) protocol data units (PDUs). The PDUs may then be sent to the client on a separate UDP link instead of the TCP link. On the client side, the client may detect which graphic elements within a frame were "lost" as a result of dropped UDP packets and request a refresh from the server through the lossless channel (i.e., the TCP link).

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
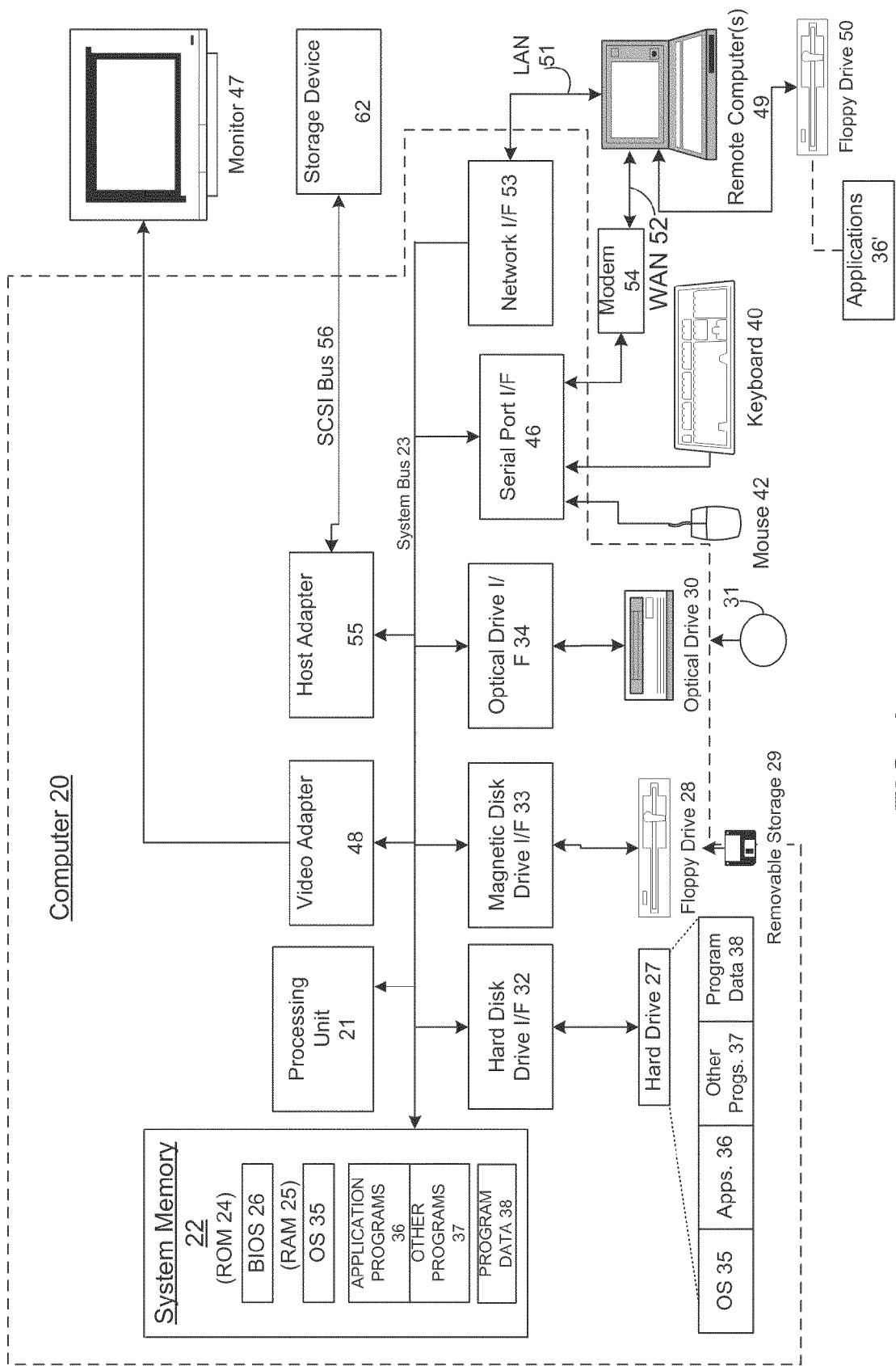
FIGS. 1 and 2 depict an example computer system wherein aspects of the present disclosure can be implemented.
Figure 2:
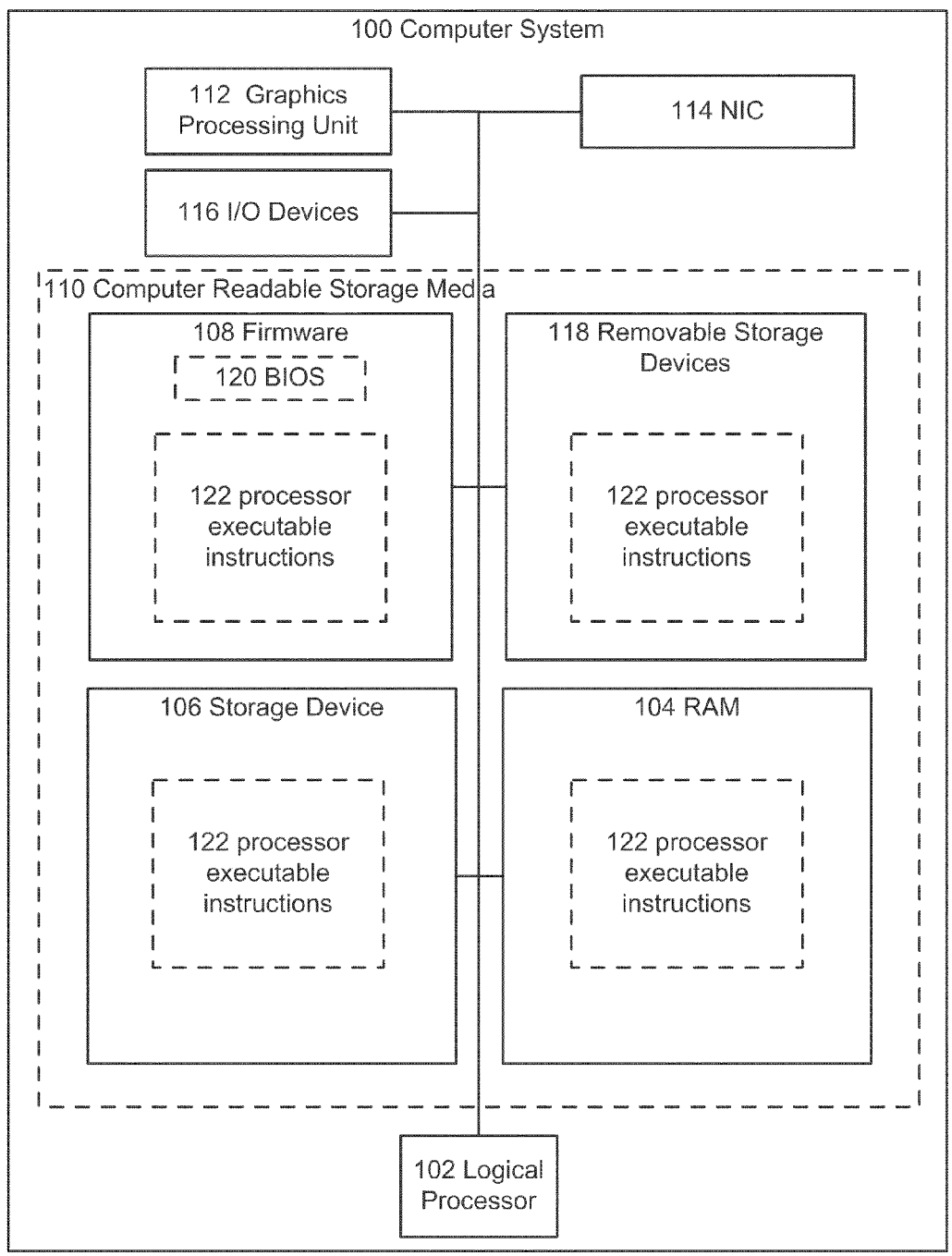

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/ software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
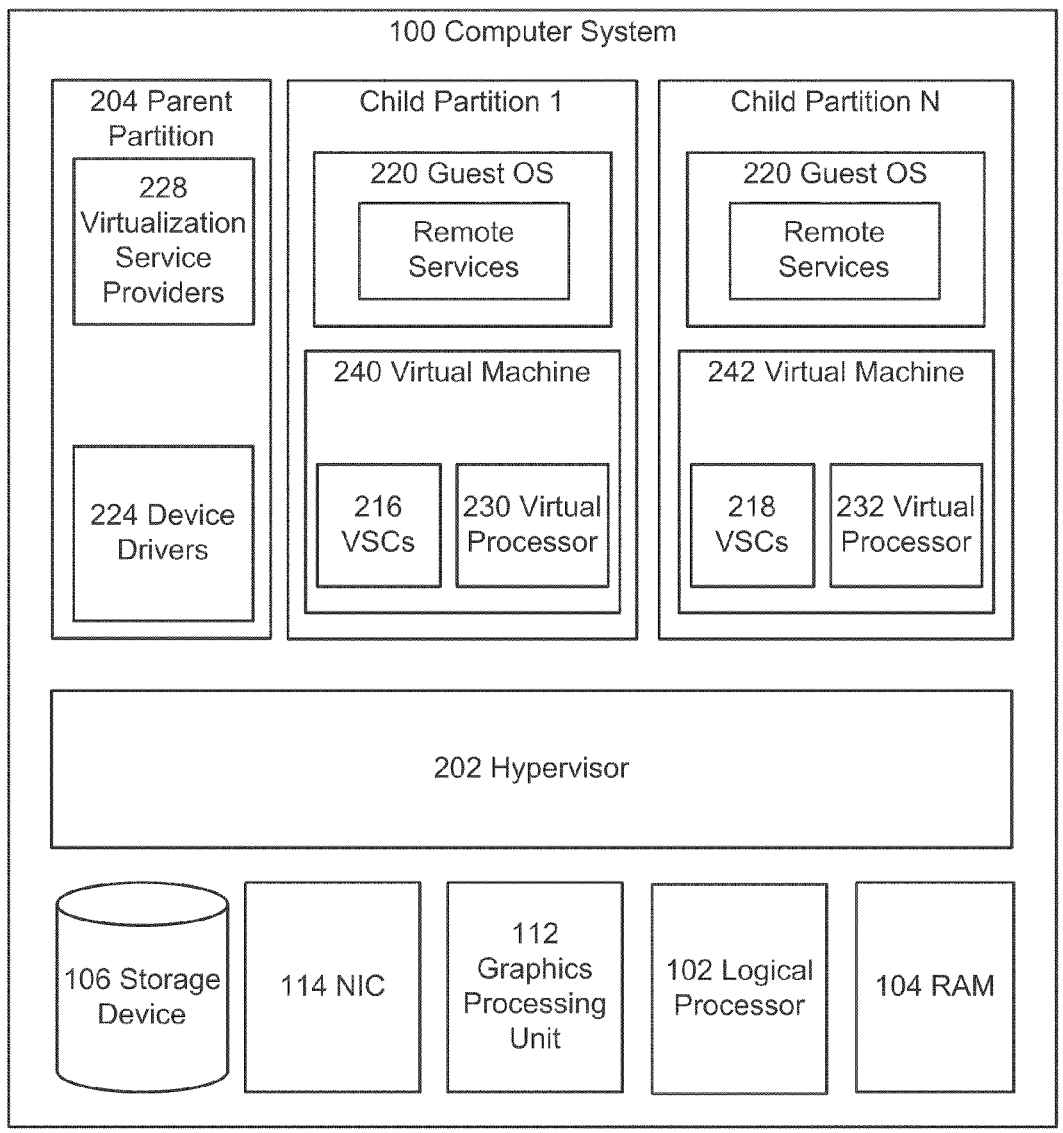
FIG. 3 depicts an operational environment for practicing aspects of the present disclosure.
Figure 4:
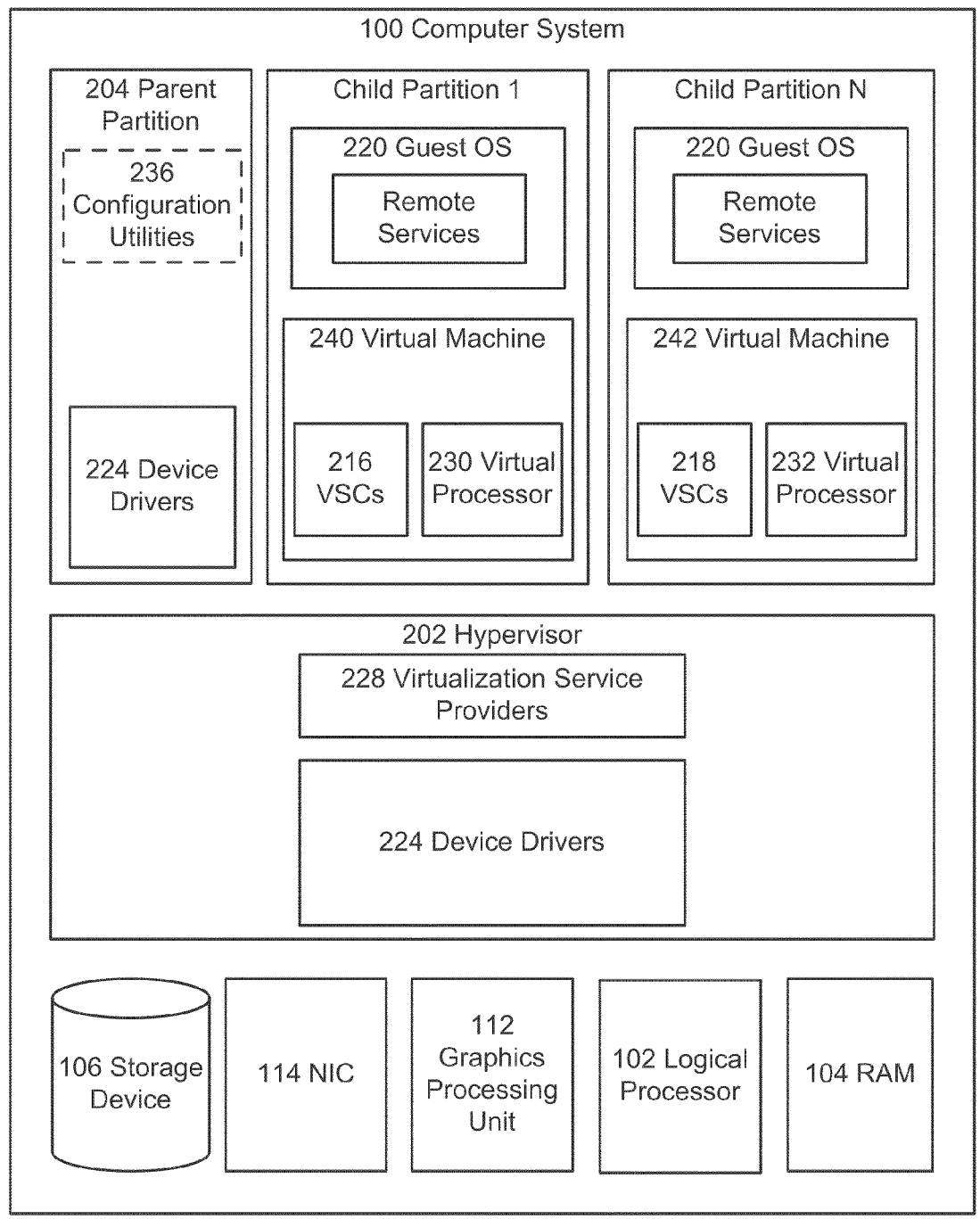
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
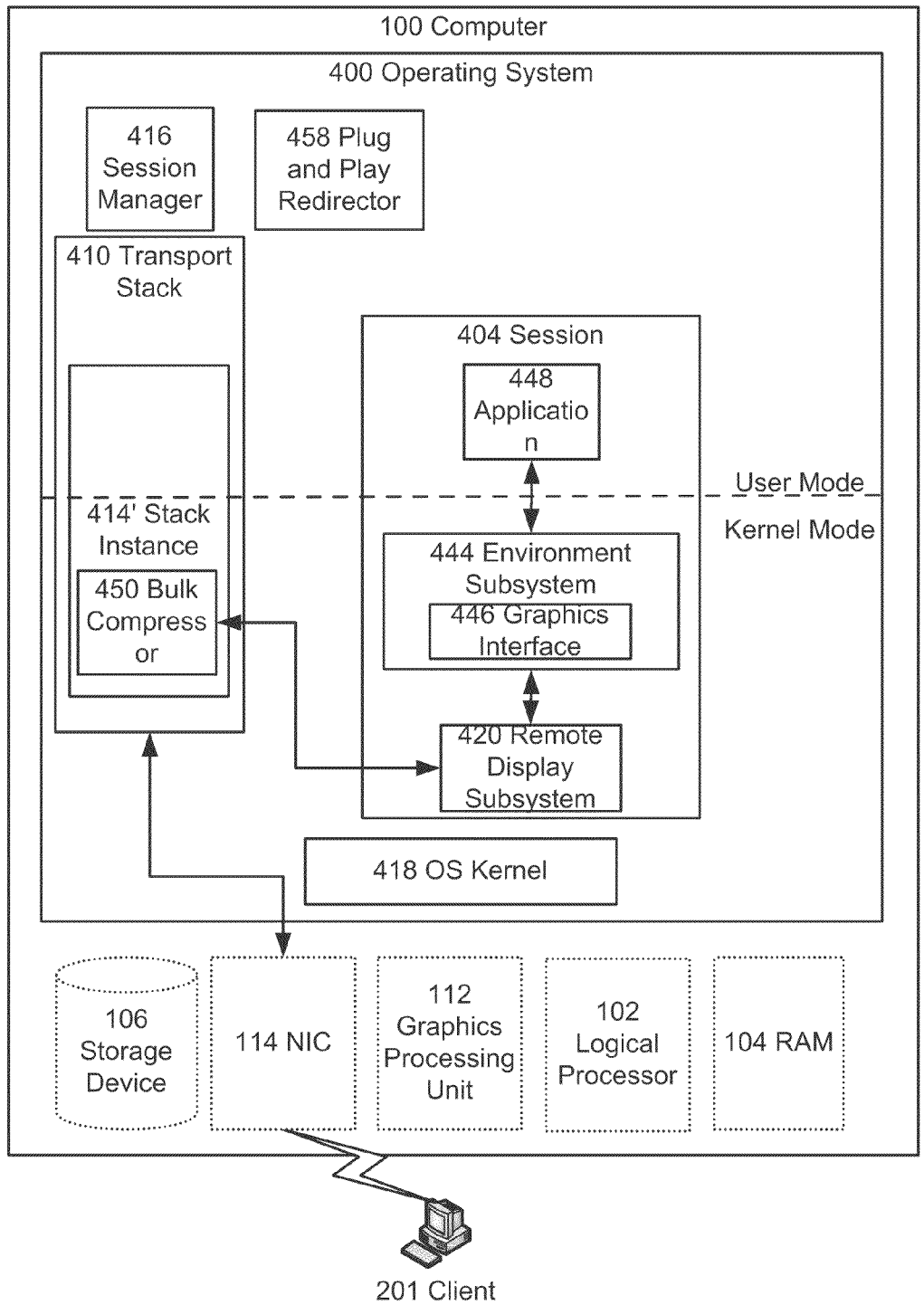
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1*b*. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
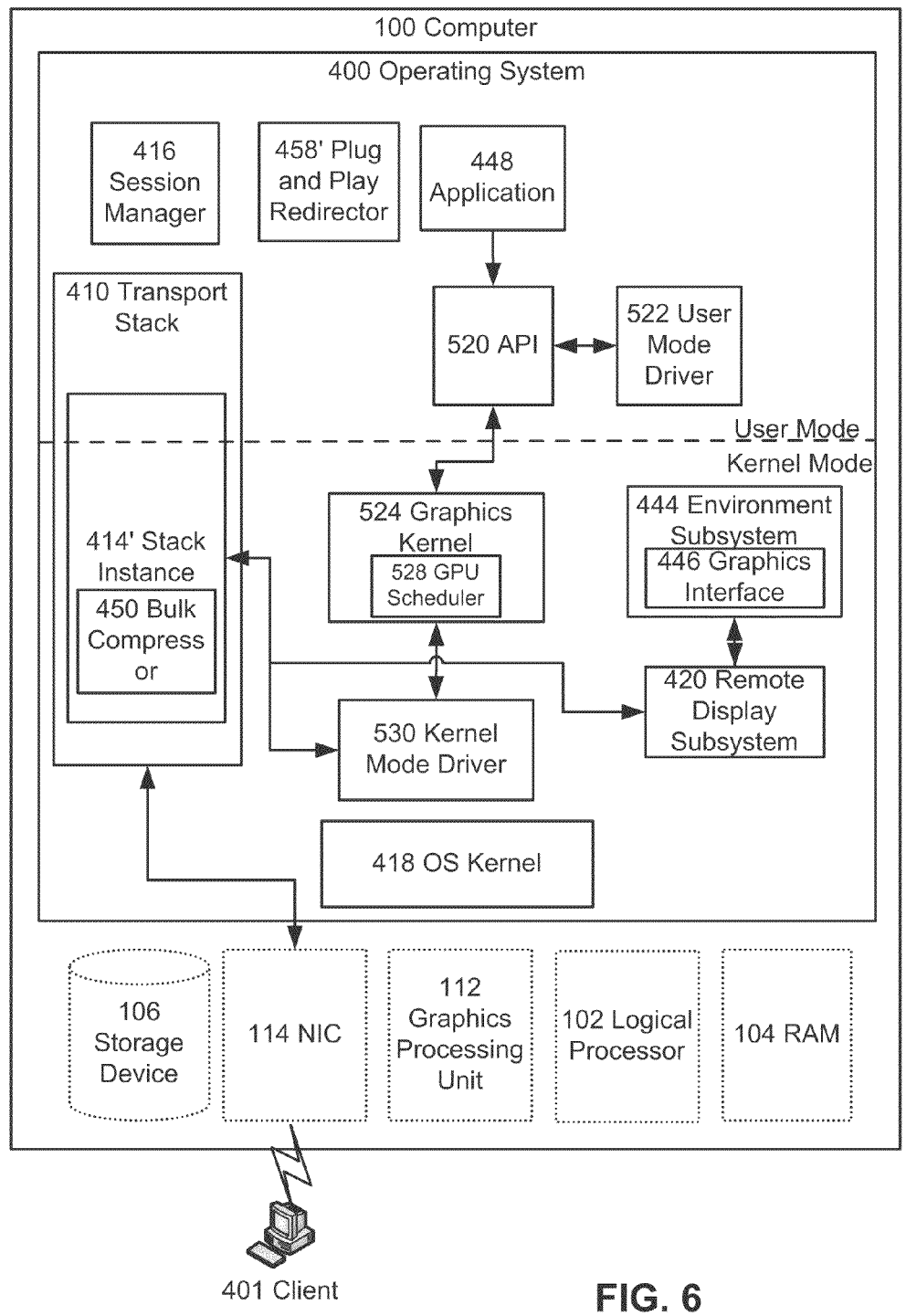
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Loss Tolerant Protocol

The process of compressing, encoding and decoding graphics data as referring to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the transmission of remote presentation graphics data to a client computer may be implemented to provide a more timely and rich user experience. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented protocol that may use a stream based transport such as the Transmission Control Protocol (TCP) for exchanging data with the client. Protocols such as the TCP protocol typically exhibit high latency especially when the underlying transport is a wide area network (WAN) connection. If such a link is used for RDP traffic, such latencies may result in a negative user experience because the desktop graphics data may be delivered to the client in a time delayed fashion.

Accordingly, when providing a remote presentation session with a client computer using a protocol such as RDP, in some scenarios it may be desirable to execute the protocol over a lossy transport. For example, when a particular link is experiencing a high loss rate, the use of some stream-based protocols such as TCP may result in a significant delay. In such protocols, when data packets are not properly received or lost, the lost data packets must be retransmitted before progress can be made in the processing of the received data. Thus in such cases it may be advantageous to use a lossy datagram transport mechanism rather than a streaming lossless transport mechanism. Lossy protocols can be any type of protocol that may generally be characterized as protocol with lossy semantics. Such protocols may not provide verification of delivery, retransmission of lost data, and implied or explicit ordering of data packets. Such protocols may also be referred to as a datagram protocol. By being able to transmit data on a lossy datagram protocol, much of the delay caused by recovery mechanisms for lost packets may be avoided. In various embodiments disclosed herein, methods are described that address the above issues by providing a loss tolerant graphics exchange protocol and thus allowing the use of a non-stream based protocol such as User Datagram Protocol (UDP).

It is also desirable to be able to recover the lost data packets rather than ignoring the lost packets and not rendering the lost data on the client side. If such data recovery is desired, then it may be necessary to employ mechanisms for recovering from a link loss. It is thus desirable to develop a mechanism that can provide a lossy stream type link to support protocols such as RDP and also provide a mechanism to recover lost data packets as in a lossless channel.

In some embodiments, some of the RDP specific encoding techniques may be modified in such a way that the data can be transmitted over transports without guaranteed packet delivery. In one embodiment, the desktop graphics data may be encoded in individual frames, each frame comprising self-contained graphics elements that fit in a small number of User Datagram Protocol (UDP) protocol data units (PDUs). The PDUs may then be sent to the client on a separate UDP link instead of the TCP link. On the client side, the client may detect which graphic elements within a frame were "lost" as a result of dropped UDP packets and request a refresh from the server through the lossless channel (i.e., the TCP link).

In various embodiments, methods are disclosed for (1) organizing client screen updates into frames and determining which packets belong to a particular frame and which packets in a frame were lost, (2) providing a hybrid RDP/TCP link (or similar) for correcting data loss by requesting screen updates from the server, (3) using the hybrid link for exchanging encryption keys and using a PDU's sequence number to select an encryption key, and (4) applying a bulk compression algorithm on the payload for a single UDP packet or a packet group and resetting the compression history after each group.

Lossless protocols such as TCP require more overhead to provide guaranteed delivery and data packet ordering. Such protocols require that the transport or lower level layer provide mechanisms to acknowledge receipt of the data and if necessary to retransmit the data. Such overhead results in data transmission latency. However, if a lossy link is used that does not require such overhead, the rendering system may continue to render the received data with the assumption that lost data can be recovered at a later time. By using a combination of protocols below the remote presentation application layer, the objectives of the remote presentation application may be supported while data recovery mechanisms can be employed resulting in effective video data transmission that is more targeted for the type of data being transported. For example, if a client screen is being rendered and part of the screen has not been received, then the employment of the combination of protocols may enable decisions such as notifying the server that some data was not received. Furthermore, the server may determine that the missing data was already retransmitted and that it does not need to send more data.

By using such a mechanism, graphics data can be efficiently streamed using a lossy protocol with lower transport overhead and using a lossless protocol over a second channel to extend information to allow for data recovery. For example, in one embodiment, a hybrid mode can be established wherein a lossless transport such as TCP is used as a control channel. By using TCP as a control channel, the requirements for such a link can be simplified while maintaining the advantage of interoperability with existing protocols that use a lossless streaming protocol.

Figure 7:
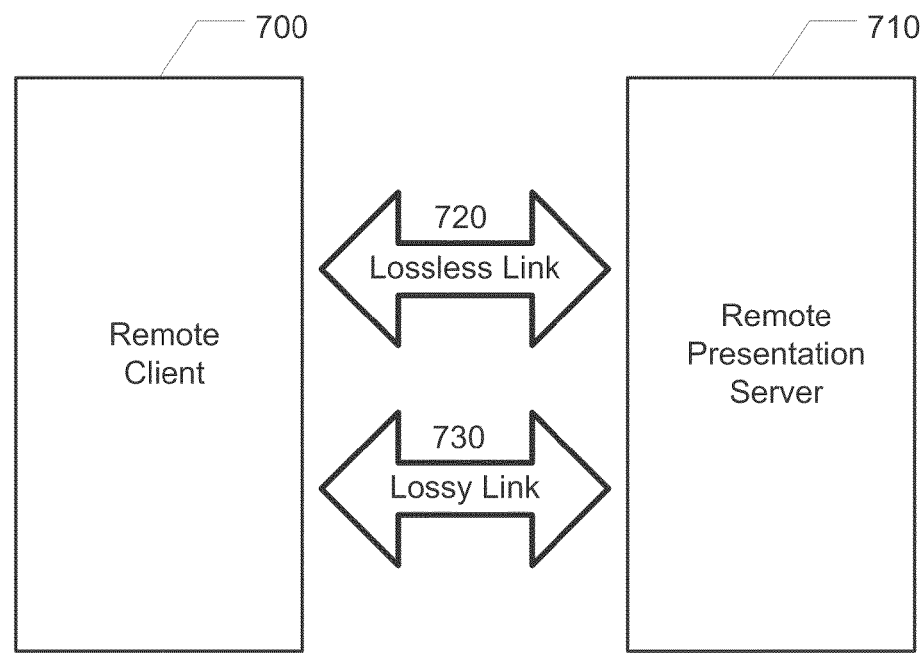
FIG. 7 illustrates an overview of some of the processes disclosed herein.

In one embodiment, a secondary UDP connection may be provided for transmitting the graphics data. FIG. 7 depicts a connection between a remote presentation server 710 and a remote client 700. In typical remote presentation configurations, the client and the server exchange information through the lossless link 720. Such information may comprise both control and graphics data. In an embodiment, a lossy link 730 is added to the connection between the client and the server. The lossy link 730 may be used to exchange the graphics data. The lossless link 720 may be used for control type data, such as a list of encryption keys or bitmap cache confirmation.

In one embodiment, a first connection may be established with the client computer, the first connection being established using a lossless protocol characterized by guaranteed packet delivery and packet order. Connection capabilities may then be established with the client computer to determine whether the client computer and/or the graphics source can support a second connection. The second connection may use a lossy protocol characterized by non-guaranteed packet delivery and packet ordering. If both endpoints can support the second connection, then the second connection can be established. Once established, the first connection can be used to manage graphics data transmission to the client computer and the second connection can be used to transmit the remote presentation graphics data to the client computer. Thus in some embodiments a first connection using a lossless protocol such as TCP can be established, and optionally the endpoints can negotiate to establish a second lossy link using, for example, UDP to more efficiently transmit graphics data. Additionally and optionally, the second connection can be terminated and the first connection used to transmit the remote presentation graphics data as a fallback transmission method. For example, if the network changes such that use of the second connection cannot be tolerated or if a connectivity issue arises because, for example, the lossy link cannot traverse a firewall, then the remote presentation session can degrade to use only the first connection as a fallback. In some embodiments this fallback mechanism can occur automatically.

It is advantageous to maintain a control channel over a lossless link while transmitting data over the lossy channel in order to exchange information regarding the status of the lossy link. For example, using the control channel the endpoints can exchange information as to whether the connection has been closed and otherwise manage the connection such as managing the lifetime of the connection. In some embodiments the client can send feedback to the server as to whether any expected data was not received. In one embodiment, the server or graphics source may receive from the client computer, using the first connection, feedback describing remote presentation graphics data that was not received. In response to the feedback, the server or graphics source may transmit, over the second (lossy) connection, the remote presentation graphics data that was not received. Thus in some embodiments, in the event of a data loss issue, rather than re-transmitting large portions of the data, the server or graphics source may only send any unreceived packets indicated by the client. In some embodiments, the server or graphics source may wait for a predetermined period of time for acknowledgements of data received. If there is no acknowledgment then the server or graphics source may assume that an unacknowledged data packet was lost and needs to be retransmitted.

In various embodiments, the types of data to be transmitted can be divided into two categories. One category can include data that should not use a lossy link such as, for example, a security handshake or capability negotiation. A second category can include data that can us a lossy link such as video data. The first category can also include data for management of the lossy data, such as data that indicates that a certain piece of the client screen was not received.

The first category may use a primary link that can generally be characterized as a lossless link that guarantees data delivery and provides indication of the order of the data packets. Lossless protocols can be any type of protocol that may generally be characterized as a protocol with lossless semantics. Such protocols may provide one or more of the following functions: verification of delivery, retransmission of lost data, and implied or explicit ordering of data packets. Higher level protocols for remote desktop presentation include Remote Desktop Protocol (RDP) which is used herein for illustrative purposes. However, the concepts and methods disclosed may be used in conjunction with other remote presentation protocols.

In one embodiment, the graphics updates may be partitioned into frames. A frame may contain information that represents a client screen for remote presentation during, for example, a virtual machine session. In some embodiments, the client may assume that any parts of the frame that were not received were encoded in lost packets and thus not received. While in the present disclosure the graphics elements used within a frame are assumed to be bitmaps, other types of graphics elements may also be used.

Figure 8:
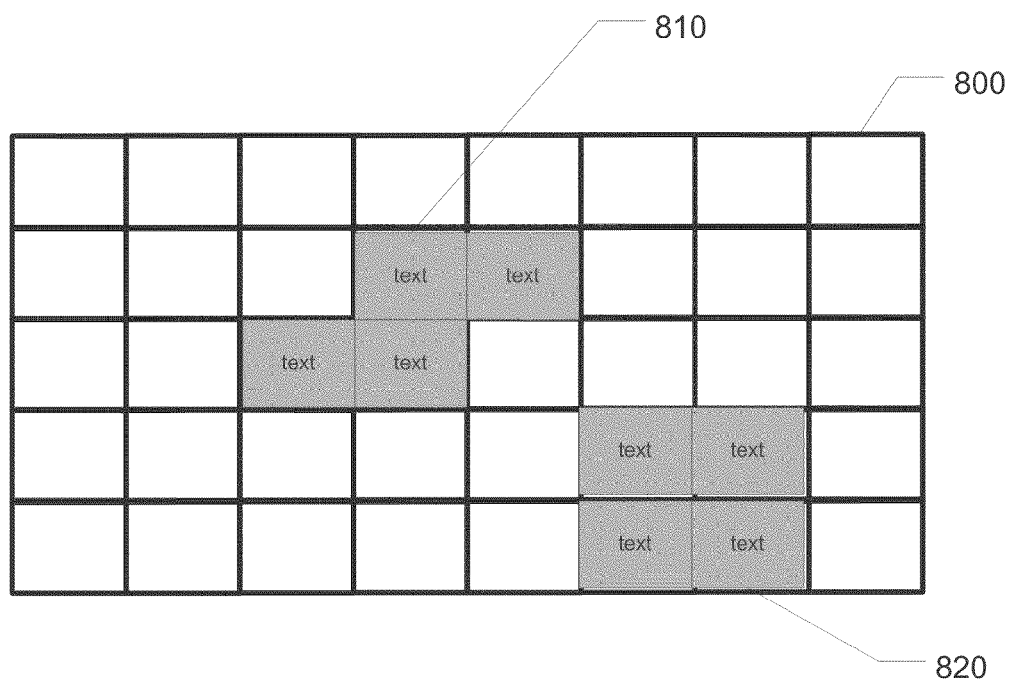
FIG. 8 illustrates an example architecture incorporating aspects of the methods disclosed herein.

FIG. 8 depicts an example user screen 800 of a user's desktop divided into rectangular tiles. The desktop may be "tiled" in equally sized bitmaps, which may then be represented as a frame. In this example, the darkened tiles 810 and 820 represent tiles that have changed and are to be sent to the client. Thus in this case the frame that is sent to the client will contain two types of graphics elements. The tiles that are not changed may be represented as empty rectangles. The tiles that have changed may actually be sent as encoded bitmaps.

In standard RDP encoding, the bitmaps or graphics elements are typically encoded without regard to the size of the transport MTU. The MTU is the maximum transfer unit and represents the size, typically in bytes, of the largest protocol data unit. In some embodiments of the present disclosure, the graphics elements may be contained in either one or a limited set of underlying transport packets. If the graphics elements are contained in one packet, then the packets may be independent and the client will be able to extract useful information from each received packet. Thus in one embodiment, the size of the actual graphic element may be constrained to one MTU. For example, if the MTU size is 1480 bytes as is typical in a WAN, the server will be able to encode in one MTU a 32×32 pixel uncompressed monochrome bitmap. The server will also be able to encode a 32×32 32 bpp bitmap that is compressed with an algorithm that cuts the size of the bitmap by approximately three times.

As discussed above, in some embodiments the disclosed protocol may operate on full frames. For example, the server may encode the screen content as a full frame, and the client may re-construct this content as a full frame. Any "missing" areas of the frame may be considered a result of lost PDUs. Thus in one embodiment, a graphics element contained in a PDU may contain sufficient information such the client can determine the frame that the graphics element belongs to as well as the position within the frame occupied by that element.

Figure 9:
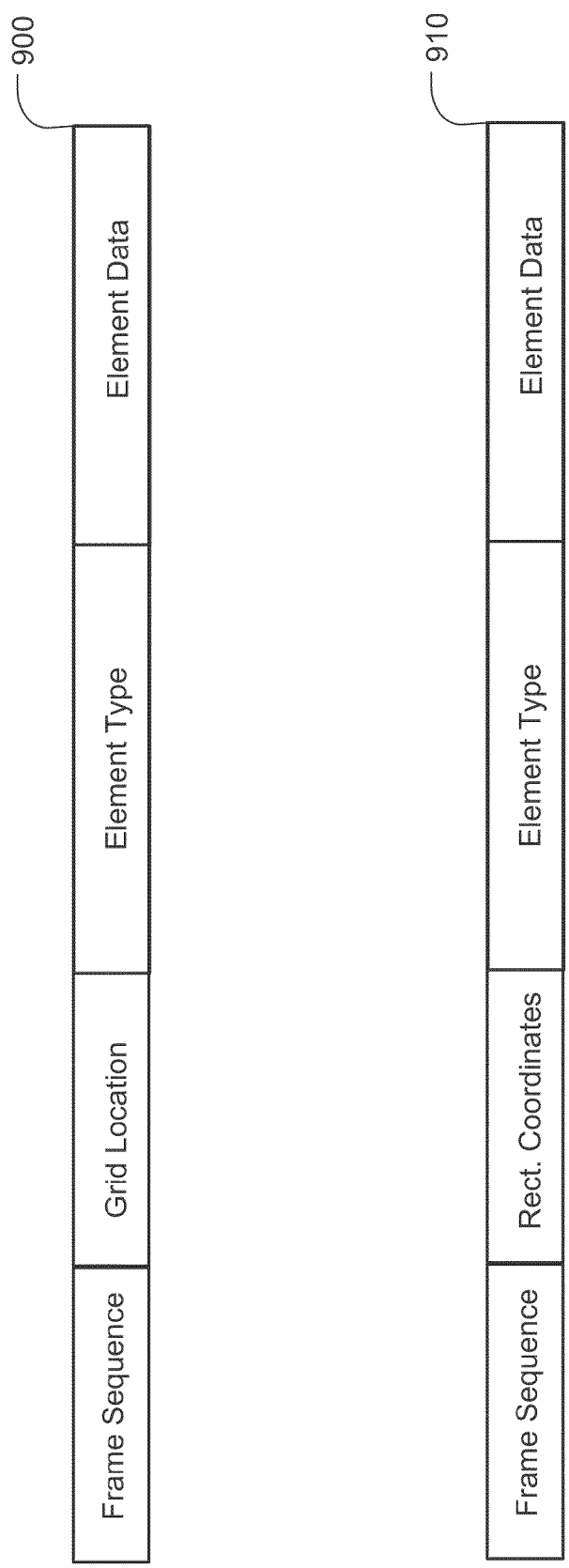
FIG. 9 illustrates an example architecture incorporating aspects of the methods disclosed herein.

FIG. 9 exemplifies two example encodings of frame elements. In one embodiment illustrated by data packet 900, the PDUs may include a frame sequence number. This frame sequence number may be used by the client to determine the frame that the graphics element(s) contained in the PDU belong to. A change in the frame sequence number may also indicate the start of a new frame. While the frame sequence number need not be an absolute value, the number should be large enough to identify a frame transition in cases in which entire frames are lost.

In another embodiment illustrated by data packet 910, the elements encoded in a frame may contain geometry information. For example, if the graphics elements are equally sized bitmaps, then the bitmap's placement on the screen can be identified by the bitmap's position within the grid. If the elements can be of arbitrary geometry, then the graphics element position may be specified through rectangle coordinates.

In some embodiments, an element type may be provided that describes what type of graphics primitive is encoded in the PDU. For example, for areas that have not changed an "empty rectangle" element type may be used. Another example of a graphics type is an opaque rectangle or bitmap (i.e., the graphics element is not transparent and thus the bitmap of the previous screen area covered by the new screen area is not needed).

When data is transmitted over a lossy protocol, a number of issues may need to be addressed in order to support remote presentation protocols. For example, bulk compression is typically applied to the remote presentation data prior to transmission. Bulk compressors typically operate by encoding data as a function of earlier data. However, as discussed above it is desirable for graphics elements to be encoded into one MTU, and thus in the case of a lossy transport the data necessary for de-compression should be self contained within a PDU. Accordingly, the bulk compression history may have to be reset before compressing/de-compressing each PDU.

If a multiple PDU transport technique is used, then the compression history can be reset only after all the PDUs within an update are compressed. Bulk compression is a history-based compression technique and thus if one of the packets in the stream is lost, then the state may become inconsistent and synchronization may be lost. In one embodiment, the compression context can be reset after each packet is transmitted, thus allowing each packet to be decompressed independently. In another embodiment, the number of packets to be included in the decompression may be determined dynamically. For example, the compression history may be reset after every four packets. If one of the data packets are lost, then the server or graphics source may need to resend all four packets. If the data packet loss rate is too high, causing repeated retransmissions of packet groups, then the compression history reset point may be balanced based on the network conditions or other factors such as the probability of losing a packet and the efficiency of sending more data packets before resetting the context. In one embodiment the number of packets in the compression history may be adjusted from one to N.

When data is transmitted over a lossy protocol, issues related to encryption of the data may also need to be addressed. It is typically desirable to encrypt the graphics elements or frames. Examples of encryption schemes include Secure Sockets Layer (SSL) that are typically used to provide security for communications over networks. In the various disclosed embodiments, encryption may need to be accomplished within the context of a PDU. To provide security in this context, it may be necessary for the server to generate new encryption keys more often and communicate those keys to the client. The context for the encryption scheme should also be determined when using a lossy link due to the possibility of lost data packets. The server may communicate to the client the new encryption key as well as the packet for which the new encryption key should be used. In one embodiment, a non-encrypted sequence number can be provided for each packet. The encryption keys may be sent through the reliable TCP link along with the range of packet numbers that the keys apply to.

While the context can be set at one packet, encryption keys can be used for blocks of data. For example, a sequence ID can be provided to identify, for one or more packets, which encryption context is to be used. In one embodiment, an encryption key for decrypting the encrypted remote presentation graphics data can be transmitted to the client along with an indication of a range of data packets for which the encryption key should be used. Encryption keys can be renegotiated so that the client can be sent a new set of keys to be used for packets to be received from a given epoch.

Additionally, each packet may be associated with a unique sequence number and a unique frame number to further associate keys with applicable data packets. In one embodiment, a predetermined number of encryption keys may be transmitted to the client using the lossless connection, and a selection identifying one of the encryption keys to be used for decrypting the remote presentation graphics data may then be transmitted to the client computer. In another embodiment, a schema can be provided wherein the server sends a plurality of keys. A specific key may be selected by applying a modulo function to the packet sequence number.

When transmitting the remote presentation graphics data over the lossy link, in some cases it may be desirable to maximize the amount of graphics data inserted into the MTU up to the MTU limit. Using more of the MTU capacity may provide greater efficiency because each packet will carry more graphics data while the protocol overhead such as headers or underlying per-packet delays remain fixed. Higher efficiency may provide an improvement in bulk protocol throughput. Furthermore, when a packet is lost it may be advantageous to minimize the number of packets that need to be retransmitted and thus it may be advantageous to reduce the interdependencies between packets. Thus in some embodiments it may be advantageous to package the data into the packets such that each packet is as much as possible independently actionable and decodable.

In some cases, however, graphics elements can be fit into more than one MTU or a small number of MTUs. The number of MTUs can be adapted based on the loss level that is expected or has been detected on the link. The size of a data packet may be increased but more data will be lost if the packet is lost. On the other hand, smaller packets do not compress as well from a bulk compression perspective and so the amount of data to be placed on a packet can be determined in consideration of the above factors.

In some cases, constraining the graphics element size to the MTU size might be limiting in terms of what kind of graphics elements can be encoded. For example, a non-compressed 32×32 bitmap may requite four times the size of a WAN MTU. If it is desirable to encode larger graphics elements, in some embodiments an algorithm may be applied so that the client can re-assemble such elements from multiple MTU size packets. In such situations, if a packet that contains graphics data is lost, it may not be possible to reassemble the original graphics element and any other packet containing information specific to that element may have to be discarded.

As previously mentioned, in some embodiments the disclosed protocol is based on the idea that the client will expect fully described frames. Accordingly, the client may keep track of the areas that were received for a frame. Once the client detects that a new frame has started, the client may initialize a region object that corresponds to the whole screen and the region object can be used for tracking the received regions as represented by the received encoded data. As updates are received, the client may subtract the area occupied by the updates from the tracking region. If all the updates in a frame are received, then the tracking region will be essentially empty. If the area is not empty, then the client can determine that not all the graphics updates were received. In that case the client may request a refresh from the server for that particular area through the TCP control channel.

Some screen elements within a frame, such as rectangles that have not changed, may be small and can be encoded within a single PDU. However, the loss of such a PDU may cause the client to request from the server an update for the entire area that was described by the empty rectangles. Providing such an update may be costly because of the multiple screen areas involved. To avoid the consequences of the loss of such packets, it may be desirable to send duplicate PDUs for elements such as data describing non-changed rectangles.

The methods disclosed herein are not limited to a particular type of graphics data such as bitmaps. The disclosed methods can apply to any type of graphic object. For example, the graphics data may comprise a description of entities to be drawn. Generally the lossless channel can be used to notify the client of the type and nature of the data that will be transmitted and the expected result after rendering. The actual graphics data can then be transmitted to the client on the lossy channel, and the client can compare what was actually received and the result of the rendering actions to determine if any data was missing or if there is a discrepancy between what was expected in the received data or as a result of performing the expected actions on the data. In one embodiment the client can note any transactions not received or screen areas that have not been updated and notify the server of the discrepancy. In other embodiments, the client make some intelligent decisions such as determining that only a small portion of the screen is missing and determining to wait longer for the missing data or determine that the data is not needed.

The above described techniques may be applied to multiple monitor scenarios. A component on the server may, for example, determine the number of video presentation paths from the video presentation network information as maintained by the server. Each video presentation source may be provided with a set of video data as described above.

Figure 10:
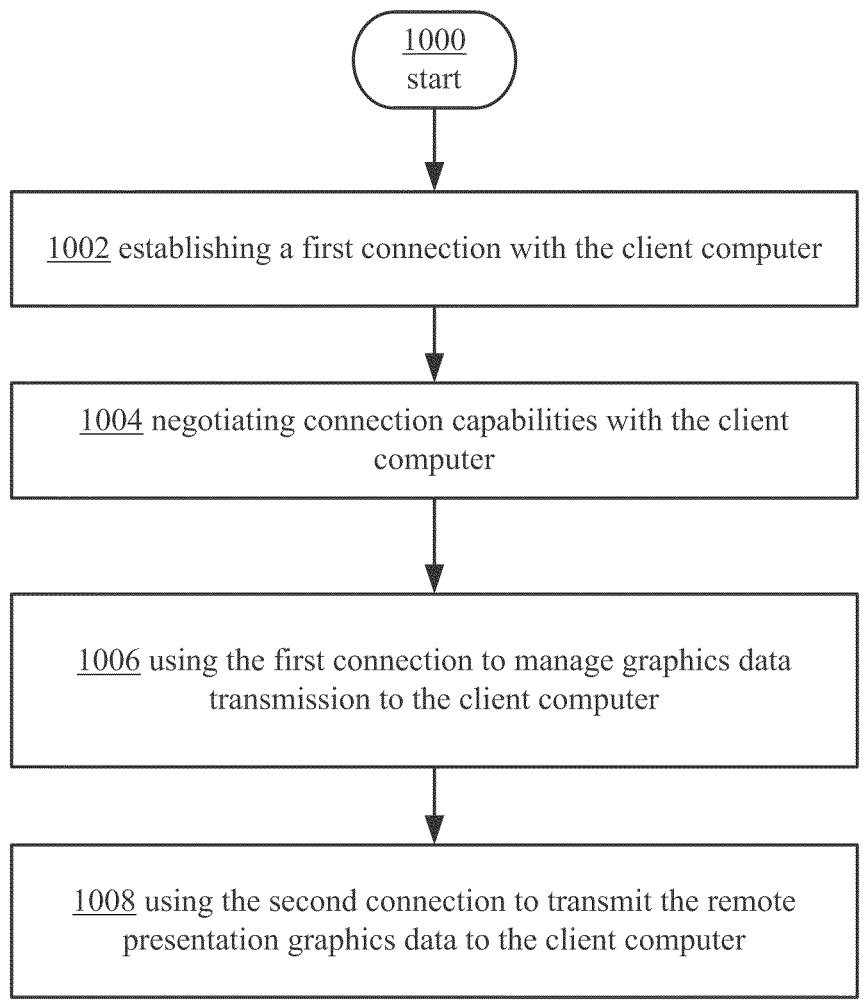
FIG. 10 illustrates an example of an operational procedure for processing graphics data for transmission to a client computer.

FIG. 10 depicts an exemplary operational procedure for transmitting remote presentation graphics data to a client computer including operations 1000, 1002, 1004, and 1006. Referring to FIG. 10, operation 1000 begins the operational procedure and operation 1002 illustrates establishing a first connection with the client computer, the first connection established using a lossless protocol characterized by guaranteed packet delivery and packet order. Operation 1004 illustrates negotiating connection capabilities with the client computer to determine that the client computer can support a second connection and establishing the second connection, the second connection established using a lossy protocol characterized by non-guaranteed packet delivery and packet ordering. Operation 1006 illustrates using the first connection to manage graphics data transmission to the client computer and operation 1008 illustrates using the second connection to transmit the remote presentation graphics data to the client computer.

Figure 11:
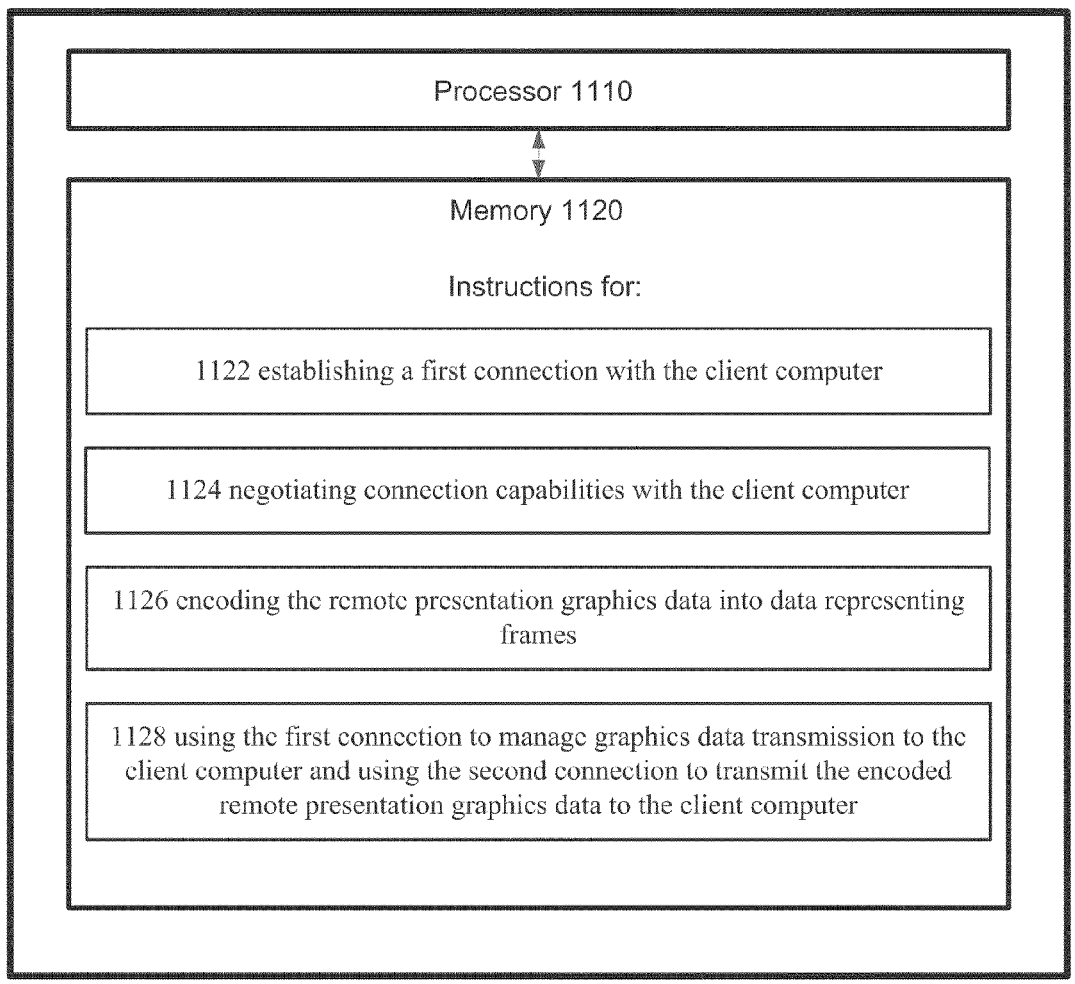
FIG. 11 illustrates an example system for processing graphics data for transmission to a client computer.

FIG. 11 depicts an exemplary system for processing graphics data for transmission to a plurality of client computers as described above. Referring to FIG. 11, system 1100 comprises a processor 1110 and memory 1120. Memory 1120 further comprises computer instructions configured to transmit remote presentation graphics data to a client computer. Block 1122 illustrates establishing a first connection with the client computer, the first connection established using a lossless protocol characterized by guaranteed packet delivery and packet order. Block 1124 illustrates negotiating connection capabilities with the client computer to determine that the client computer can support a second connection and establishing the second connection, the second connection established using a lossy protocol characterized by non-guaranteed packet delivery and packet ordering. Block 1126 illustrates encoding the remote presentation graphics data into data representing frames, each frame comprising information for representing a client screen, wherein the encoding comprises dividing the client screen into self-contained graphics elements. Block 1128 illustrates using the first connection to manage graphics data transmission to the client computer and using the second connection to transmit the encoded remote presentation graphics data to the client computer.

Figure 12:
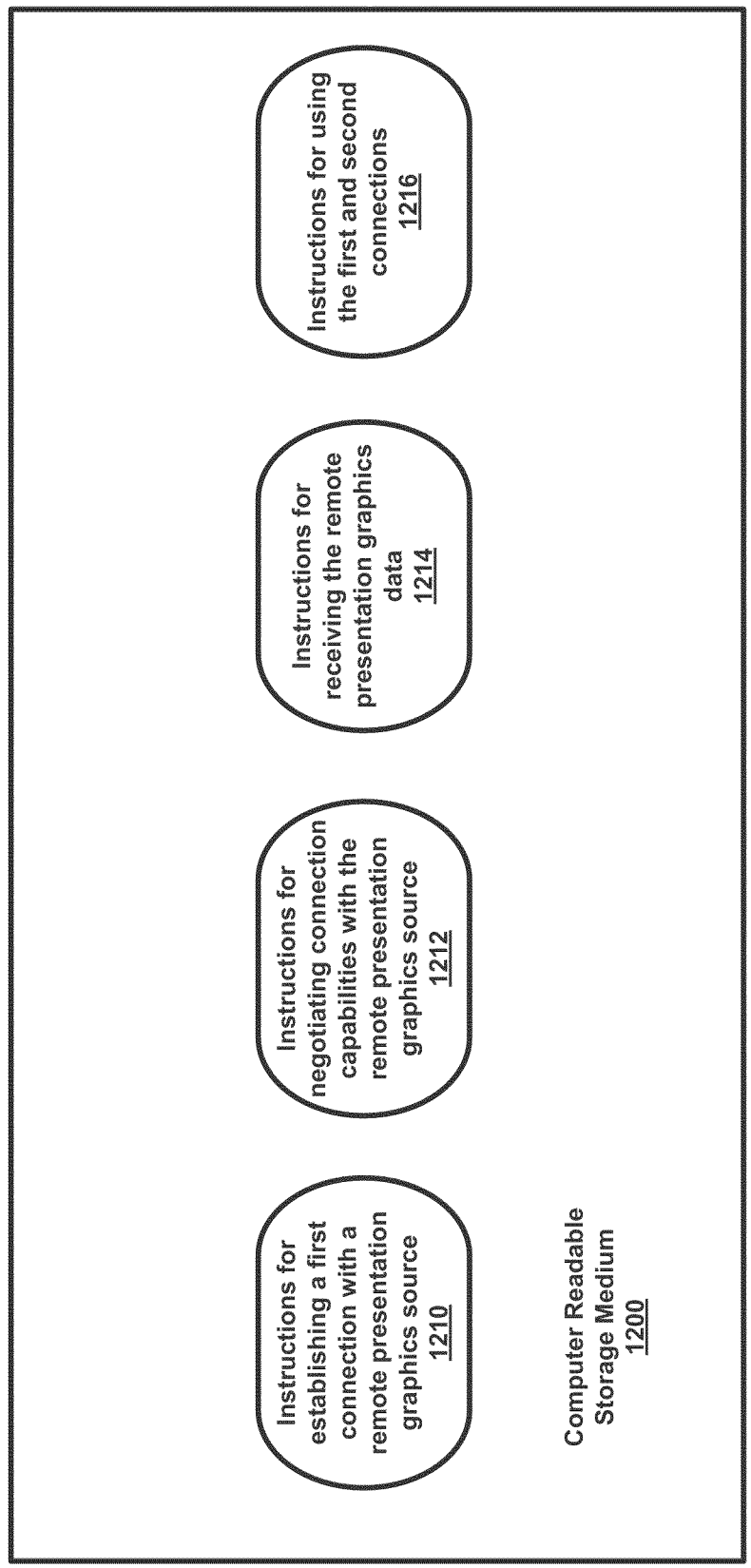
FIG. 12 illustrates a computer readable medium bearing computer executable instructions discussed with respect to FIGS. 1-11.

Any of the above mentioned aspects can be implemented in methods, systems, computer readable media, or any type of manufacture. For example, per FIG. 12, a computer readable medium can store thereon computer executable instructions for receiving remote presentation graphics data on a client computer. Such media can comprise a first subset of instructions for establishing a first connection with a remote presentation graphics source, the first connection established using a lossless protocol characterized by guaranteed packet delivery and packet order 1210; a second subset of instructions for negotiating connection capabilities with the remote presentation graphics source to determine that the client computer can support a second connection and establishing the second connection, the second connection established using a lossy protocol characterized by non-guaranteed packet delivery and packet ordering 1212; a third subset of instructions for receiving the remote presentation graphics data, wherein the remote presentation graphics data represents frames comprising information for representing client screens and wherein the remote presentation graphics data comprises self-contained graphics elements 1214, and a fourth subset of instructions for using the first connection to manage graphics data reception and using the second connection to receive the remote presentation graphics data 1216. It will be appreciated by those skilled in the art that additional sets of instructions can be used to capture the various other aspects disclosed herein, and that the three presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. In a computing system comprising a processor and memory, a method for transmitting remote presentation graphics data to a client computer, the method comprising:
    establishing a first connection with the client computer, the first connection established using a lossless protocol characterized by guaranteed packet delivery and packet order;
    negotiating connection capabilities with the client computer to determine that the client computer can support a second connection and establishing the second connection, the second connection established using a lossy protocol characterized by non-guaranteed packet delivery and packet ordering; and
    sending graphics data management information over the first connection to the client computer and sending the remote presentation graphics data over the second connection to the client computer.

2. The method of claim 1, further comprising terminating the second connection and using the first connection to transmit the remote presentation graphics data as a fallback transmission method.

3. The method of claim 1, further comprising receiving from the client computer, using the first connection, feedback describing remote presentation graphics data that was not received, and in response to the feedback, transmitting, over the second connection, the remote presentation graphics data that was not received.

4. The method of claim 1, wherein the lossless protocol is TCP and the lossy protocol is UDP.

5. The method of claim 1, further comprising compressing the remote presentation graphics data before transmitting the remote presentation graphics data, wherein a number of data packets for a compression history for the compressed remote presentation graphics data is determined as a function of network conditions.

6. The method of claim 1, further comprising:
    encrypting the remote presentation graphics data before transmitting the remote presentation graphics data; and
    using the first connection, transmitting to the client an encryption key for decrypting the encrypted remote presentation graphics data and an indication of a range of data packets for which the encryption key should be used.

7. The method of claim 1, further comprising:
    encrypting the remote presentation graphics data before transmitting the remote presentation graphics data, wherein the encrypting is accomplished using one of a predetermined number of encryption keys;
    transmitting the predetermined number of encryption keys to the client using the first connection; and
    transmitting to the client computer a selection identifying one of the encryption keys to be used for decrypting the remote presentation graphics data.

8. The method of claim 1, wherein the remote presentation graphics data is transmitted in data packets and each data packet comprises a unique frame number and a unique sequence number identifying an order within a frame.

9. The method of claim 1, wherein data over the second connection is transmitted in maximum transmission units (MTUs) and a number of packets encoded in one MTU is determined based on a link loss rate.

10. The method of claim 1, wherein the remote presentation graphics data comprises geometry information that identifies a frame position corresponding to the remote presentation graphics data.

11. The method of claim 1, wherein the remote presentation graphics data comprises a type of graphics primitive included in the remote presentation graphics data.

12. The method of claim 1, further comprising sending duplicate data for a portion of the remote presentation graphics data that meet a predetermined criterion.

13. A system configured to transmit remote presentation graphics data to a client computer, comprising:
- at least one processor; and
- at least one memory communicatively coupled to said at least one processor, the memory having stored therein computer-executable instructions for:
  - establishing a first connection with the client computer, the first connection established using a lossless protocol characterized by guaranteed packet delivery and packet order;
  - negotiating connection capabilities with the client computer to determine that the client computer can support a second connection and establishing the second connection, the second connection established using a lossy protocol characterized by non-guaranteed packet delivery and packet ordering;
  - encoding the remote presentation graphics data into data representing frames, each frame comprising information for representing a client screen, wherein the encoding comprises dividing the client screen into self-contained graphics elements; and
  - sending graphics data management information over the first connection to the client computer and sending the encoded remote presentation graphics data over the second connection to the client computer.

14. The system of claim 13, wherein the self-contained graphics elements are data tiles.

15. A computer readable storage device storing thereon computer executable instructions for receiving remote presentation graphics data on a client computer, said instructions for:
- establishing a first connection with a remote presentation graphics source, the first connection established using a lossless protocol characterized by guaranteed packet delivery and packet order;
- negotiating connection capabilities with the remote presentation graphics source to determine that the client computer can support a second connection and establishing the second connection, the second connection established using a lossy protocol characterized by non-guaranteed packet delivery and packet ordering;
- receiving the remote presentation graphics data, wherein the remote presentation graphics data represents frames comprising information for representing client screens and wherein the remote presentation graphics data comprises self-contained graphics elements; and
- receiving graphics data management information over the first connection and receiving the remote presentation graphics data over the second connection.

16. The computer readable storage device of claim 15, further comprising determining that a portion of said remote presentation graphics data was not received and transmitting, using the first connection, an indication of the portion of data not received.

17. The computer readable storage device of claim 16, wherein said determining comprises waiting for a predetermined period of time after receiving other portions of the remote presentation graphics data.

18. The computer readable storage device of claim 17, further comprising rendering the received remote presentation graphics data before the portion of data is received.

19. The computer readable storage device of claim 16, wherein said determining comprises:
- for each frame, instantiating a memory object tracking regions of a client screen corresponding to the frame;
- as the remote presentation graphics data is received, identifying regions of the client screen represented by the received remote presentation graphics data; and
- determining that at least a part of the client screen has not been received based on the tracked regions.

20. The computer readable storage device of claim 15, further comprising terminating the second connection and using the first connection to receive the remote presentation graphics data as a fallback.

* * * * *